_(12)_ United States Patent
Moilanen et al.

(10) Patent No.: US 11,228,960 B2
(45) Date of Patent: Jan. 18, 2022

(54) EFFICIENT SIGNALING IN MULTI-CONNECTIVITY SCENARIOS

(71) Applicant: Nokia Technologies Oy, Espoo (FI)

(72) Inventors: Jani Moilanen, Helsinki (FI); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 60 days.

(21) Appl. No.: 16/679,507

(22) Filed: Nov. 11, 2019

(65) Prior Publication Data

US 2020/0154334 A1 May 14, 2020

Related U.S. Application Data

(60) Provisional application No. 62/760,007, filed on Nov. 12, 2018.

(51) Int. Cl.
*H04W 40/02* (2009.01)
*H04W 48/20* (2009.01)
*H04W 92/20* (2009.01)
*H04W 88/06* (2009.01)

(52) U.S. Cl.
CPC ........... *H04W 40/02* (2013.01); *H04W 48/20* (2013.01); *H04W 88/06* (2013.01); *H04W 92/20* (2013.01)

(58) Field of Classification Search
CPC ..... H04W 40/02; H04W 48/20; H04W 92/20; H04W 88/06; H04W 76/15; H04L 1/08
See application file for complete search history.

(56) References Cited

U.S. PATENT DOCUMENTS

| 2016/0352469 | A1* | 12/2016 | Xiao | ..................... H04L 1/1614 |
| 2016/0360520 | A1 | 12/2016 | Pani et al. | |
| 2017/0055176 | A1 | 2/2017 | Xiao et al. | |
| 2017/0208501 | A1 | 7/2017 | Lee et al. | |
| 2018/0098250 | A1 | 4/2018 | Vrzic et al. | |
| 2020/0137614 | A1* | 4/2020 | Hampel | ................ H04W 76/15 |

(Continued)

FOREIGN PATENT DOCUMENTS

| WO | 2018/121347 A1 | 7/2018 |
| WO | 2018/171546 A1 | 9/2018 |

OTHER PUBLICATIONS

"Revised SID: Study on NR Industrial Internet of Things (IoT)", 3GPP TSG-RAN Meeting #81, RP-182090, Agenda: 9.3.12, Nokia, Sep. 10-13, 2018, 5 pages.

(Continued)

*Primary Examiner* — Marisol Figueroa
(74) *Attorney, Agent, or Firm* — Squire Patton Boggs (US) LLP

(57) ABSTRACT

Systems, methods, apparatuses, and computer program products for efficient signaling, for example, in multi connectivity (MC) or dual connectivity (DC) scenarios with multiple packet duplicates are provided. One method may include transmitting, by a first network node, an indication over a network interface to a second network node involved in multi-connectivity. The indication indicates how to map a packet transferred over the network interface to one or more protocol entities at the second network node. The method may also include transferring the packet once over the network interface to the second network node.

16 Claims, 5 Drawing Sheets

(56) References Cited

U.S. PATENT DOCUMENTS

2020/0252831 A1\* 8/2020 Wei ..................... H04W 28/06

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.3.0, Sep. 2018, pp. 1-59.
"3rd Generation Partnership Project; Technical Specification Group Radio Access Network; NG-RAN; Xn general aspects and principles (Release 15)", 3GPP TS 38.420, V15.1.0, Sep. 2018, pp. 1-14.
"3rd Generation Partnership Project; Technical Specification Group Radio Access Network; NG-RAN; Xn application protocol (XnAP) (Release 15)", 3GPP TS 38.423, V15.1.0, Sep. 2018, pp. 1-263.
"3rd Generation Partnership Project; Technical Specification Group Radio Access Network; NG-RAN; Xn signalling transport (Release 15)", 3GPP TS 38.422, V15.1.0, Sep. 2018, pp. 1-8.
"3rd Generation Partnership Project; Technical Specification Group Radio Access Network; NG-RAN; Xn layer 1 (Release 15)", 3GPP TS 38.421, V15.0.0, Jun. 2018, pp. 1-6.
"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V1.0.0, Sep. 2018, pp. 1-59.
Aijaz et al., "Packet Duplication in Dual Connectivity Enabled 5G Wireless Networks: Overview and Challenges", IEEE Communications Magazine, Apr. 3, 2018, pp. 1-8.

\* cited by examiner

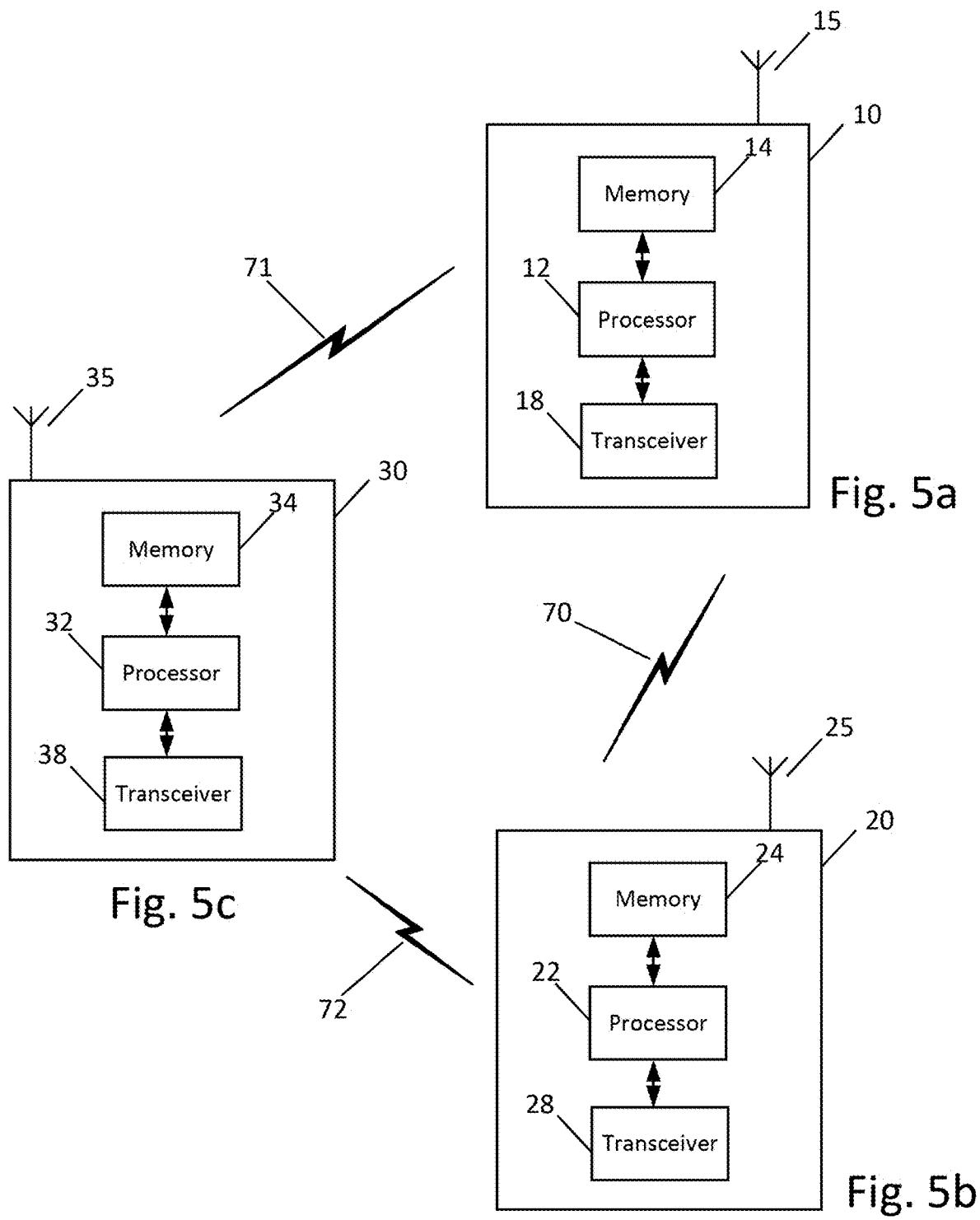

EFFICIENT SIGNALING IN MULTI-CONNECTIVITY SCENARIOS

CROSS-REFERENCE TO RELATED APPLICATIONS

This application claims priority from U.S. provisional patent application No. 62/760,007 filed on Nov. 12, 2018. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems such as 6G. For instance, certain example embodiments may relate to systems and/or methods for efficient signaling, for example, in multi connectivity (MC) or dual connectivity (DC) scenarios with multiple packet duplicates.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

One example embodiment is directed to method that may include transmitting, by a first network node, an indication over a network interface to a second network node involved in multi connectivity. The indication indicates how to map a packet transferred over the network interface to one or more protocol entities at the second network node. The method may also include transferring the packet once over the network interface to the second network node.

Another example embodiment is directed to an apparatus that may include at least one processor and at least one memory comprising computer program code. The at least one memory and computer program code may be configured, with the at least one processor, to cause the apparatus at least to transmit an indication over a network interface to a second network node involved in multi connectivity. The indication indicates how to map a packet transferred over the network interface to one or more protocol entities at the second network node. The at least one memory and computer program code may be further configured, with the at least one processor, to cause the apparatus at least to transfer the packet once over the network interface to the second network node.

Another example embodiment is directed to a method that may include receiving, at a second network node involved in multi connectivity, an indication over a network interface from a first network node. The indication may include an indication for how to map a packet transferred over the network interface to one or more protocol entities at the second network node. The method may also include receiving the packet once over the network interface from the first network node, and performing routing and duplication of the received packet according to the indication.

Another example embodiment is directed to an apparatus that may include at least one processor and at least one memory comprising computer program code. The at least one memory and computer program code may be configured, with the at least one processor, to cause the apparatus at least to receive, at a second network node involved in multi connectivity, an indication over a network interface from a first network node. The indication may include an indication for how to map a packet transferred over the network interface to one or more protocol entities at the second network node. The at least one memory and computer program code may be further configured, with the at least one processor, to cause the apparatus at least to receive the packet once over the network interface from the first network node, and to perform routing and duplication of the received packet according to the indication.

BRIEF DESCRIPTION OF THE DRAWINGS

For proper understanding of example embodiments, reference should be made to the accompanying drawings, wherein:

FIG. 5a illustrates an example block diagram of an apparatus, according to an example embodiment;

FIG. 5b illustrates an example block diagram of an apparatus, according to an embodiment; and FIG. 5c illustrates an example block diagram of an apparatus, according to an example embodiment.

DETAILED DESCRIPTION

Figure 1:
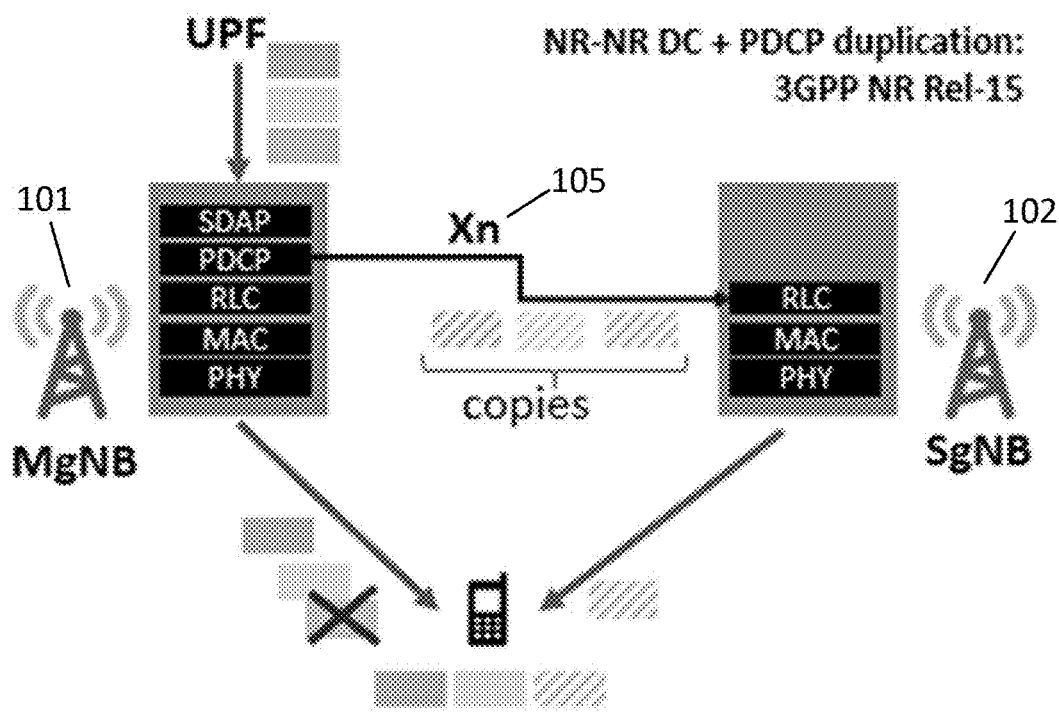
FIG. 1 illustrates an example of dual connectivity operation for data duplication, according to an example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for efficient signaling, for example, in multi connectivity (MC) or dual connectivity (DC) scenarios with multiple packet duplicates, is not intended to limit the scope of certain embodiments but is representative of selected example embodiments. For instance, some example embodiments can be applied also in multi connectivity (MC) scenarios which involve more than two gNBs or base stations.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of example embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain example embodiments may relate to 3GPP Rel-16 study item (RP-182090) on new radio (NR) Industrial Internet of Things (IoT), which includes L2/L3 enhancements including data duplication and multi-connectivity enhancements. For example, these enhancements may relate to resource efficient packet data convergence protocol (PDCP) duplication, e.g., coordination between the nodes for PDCP duplication activation and resource efficiency insurance, avoiding unnecessary duplicate transmissions, etc. Additionally, the enhancements may relate to PDCP duplication with more than two copies leveraging (combination of) DC and carrier aggregation (CA), whereupon data transmission takes places from at most two nodes.

PDCP duplication is supported in 3GPP Rel-15 NR in connection with CA and DC. 5G NR introduces reliability enhancements by allowing PDCP data duplication in which the same data packet (i.e. PDCP PDU) is independently transmitted using dual connectivity (DC) through two different nodes (i.e., DC scenarios) or carrier aggregation (CA) through two component carriers (CCs, i.e., CA scenarios). InPDCP duplication 5G NR Rel-15, the data is duplicated at the PDCP layer, transmitted independently via the two radio paths (distinct CCs or nodes) and aggregated at the receiver PDCP layer, resulting in an improvement of the achieved reliability. It is therefore considered a potential solution for URLLC application and use cases requiring ultra reliability at low latency levels, such as factory automation and alike.

In 3GPP Rel-15 NR, PDCP duplication is supported with the limitation that the PDCP entity, which duplicates PDCP protocol data units (PDUs), has only two associated radio link control (RLC) entities. FIG. 1 illustrates an example schematic block diagram of DC operation for data duplication. As illustrated in the example of FIG. 1, one of the associated RLC entities is located in the same node, e.g., the master node (MgNB) 101, and tunnels would need to be established between the PDCP entity and each corresponding RLC entity.

On one hand, from a logical standpoint, the Xn is a point-to-point interface between two NG-RAN nodes; therefore, the addition of multiple protocol entities belonging to the same nodes would not change that paradigm. Also, in case of DC, the user plane packets (i.e., PDCP PDUs) are conveyed by a general packet radio service (GPRS) tunneling protocol user plane (GTP-U) tunnel per DRB in Rel-15, where GTP-U tunnel IDs (TEIDs) define the endpoints for the tunnel. As the two associated RLC entities belong to the same DRB, this also would advocate for preferring option of having one user plane tunnel associated to the established DRB.

On the other hand, the user plane protocol procedures of Xn are used to exchange user plane information between two Xn-U protocol peers, i.e., the node hosting the PDCP and the corresponding node hosting the associated RLC entity. The procedures include transfer of Downlink User Data procedure, provision of feedback, and assistance information. In this respect, whenever more than one associated RLC entity is introduced, such one-to-one mapping between a PDCP entity and a given RLC entity would be broken. The option where two distinct tunnels are associated to each RLC entity would allow maintaining the one-to-one mapping; however, this comes at the cost of doubling the Xn capacity when transmitting the same duplicate packets over more than one user plane (UP) tunnel. That is, the PDCP entity would need to send two identical copies of the same PDCP PDU (i.e., having the same sequence number) to both RLC entities over each tunnel, which would be inefficient.

In an example embodiment, it may be assumed that one UP tunnel is established over Xn per DRB, irrespective of the number of associated RLC entities at the SgNB, and means are provided to use this single tunnel to separate the packets intended for two or more RLC entities. As a result, example embodiments can provide both Xn efficiency and duplication flexibility.

Certain example embodiments provide a flexible and efficient mechanism for a master node or base station (e.g., MgNB) to indicate, to a secondary node or base station (e.g., SgNB) involved in MC or DC, that a packet forwarded over a dedicated tunnel on a network interface (e.g., Xn) which interconnects the two nodes is intended for a specific protocol entity.

In an example embodiment, the indication may be provided in terms of a bitmap where each element is associated to one protocol entity and whose interpretation is pre-known (standardized) or pre-configured during handshake procedures between the nodes. Some example embodiments address the efficient delivery of such an indication, in order to reduce the associated overhead. For instance, a fallback mode indication in terms of an index associated to each protocol entity may be used alternatively, when only one of the protocol entities is to be used at a time.

An objective is to reduce the Xn capacity required for the MC/DC scenarios where PDCP duplication is used towards more than one RLC entity in the secondary node, while still allowing the PDCP entity to make the best/flexible use of the different RLC entities that are available, according to own criteria and on a fast basis (i.e., up to on per packet basis). Also, in an example embodiment, minimal functionality will be needed at the secondary node for the operations to (potentially) copy and transfer the received packet to the indicated protocol entities.

Figure 3:
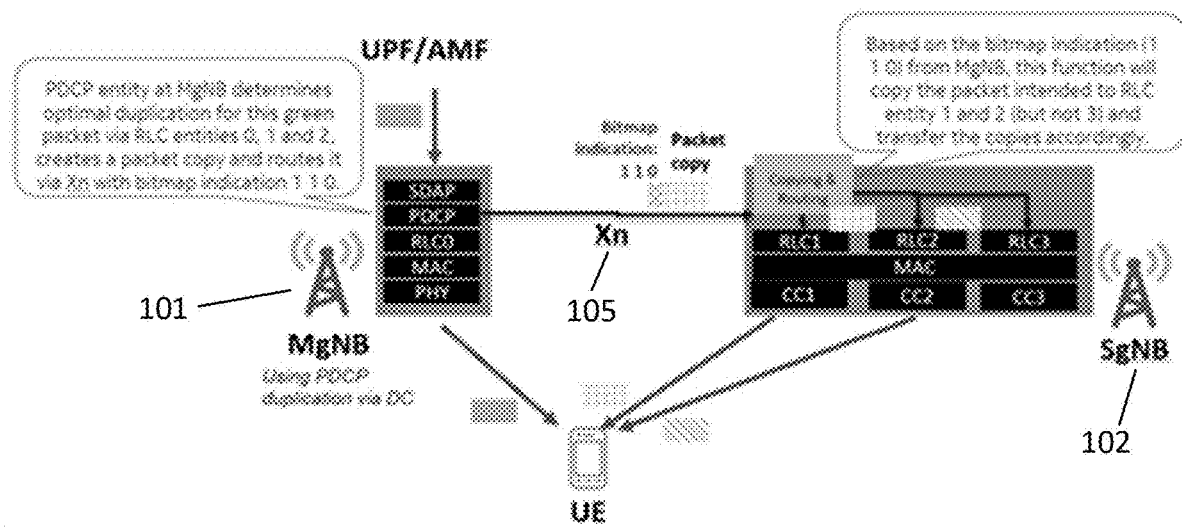
FIG. 3 illustrates an example in which three RLC entities are associated with the PDCP entity in charge of duplication, according to an example embodiment.

FIG. 3 illustrates a schematic block diagram depicting an example in which three RLC entities are associated with the PDCP entity in charge of duplication. In the example of FIG. 3, the PDCP entity at the MgNB 101 may determine the optimal duplication for a packet via the RLC entities, creates a packet copy, and routes the packet via the Xn interface 105 along with a bitmap indication. Thus, in one example, a protocol entity of the MgNB 101 may be associated with more than one corresponding protocol entity (e.g., RLC entities) at the SgNB 102. In one example embodiment, the protocol entity may be an RLC entity and the packet may be a PDCP PDU.

According to an example embodiment, along with forwarding the packet to the SgNB 102, the MgNB 101 may send an indication to the SgNB indicating to which protocol entity this packet should be associated with, from among the associated protocol entities. According to some example embodiments, the indication may be provided as a bitmap (i.e., length of bitmap=number of associated RLC entities) with value 0 or 1 per protocol entity (i.e., when the bit=0 then the packet is not intended for the corresponding protocol entity, and when the bit=1 then the packet is intended for that protocol entity).

In some example embodiments, the bitmap may have one or more of the following properties: (a) the bitmap is valid until the MgNB overrides it with a new bitmap, (b) the bitmap is valid for next N packets or for some pre-defined time after which the SgNB would fall-back to some default mode (this could be agreed in setup, or hard-coded), and/or (c) any combination of properties (a) and (b).

Table 1 below illustrates an example of the bitmap indication in the case where three RLC entities are associated.

TABLE 1

| Packet ID/Mode | RLC entity #1 | RLC entity #2 | RLC entity #3 |
| --- | --- | --- | --- |
| Default mode | 1 | 1 | 1 |
| GTP-U/PDCP SN = x | 0 | 0 | 1 |
| GTP-U/PDCP SN = x + 1 | 1 | 0 | 0 |
| GTP-U/PDCP SN = x + 2 | 0 | 1 | 1 |
| GTP-U/PDCP SN = x + 2 to x + N (e.g. N = 10) | 1 | 1 | 0 |

In some example embodiments, if no indication is received along with the user plane packet transfer, the SgNB 102 may use the protocol entity association according to a default mode. According to an example embodiment, when the network no longer has the need to use more than one protocol entity at a time at the SgNB 102, a fallback mode flag may be signaled. The fallback mode flag may suspend the use of the bitmap indication and may initiate the use of an indexing indication, i.e., where an index is associated with each RLC entity and is provided to guide the routing at the SgNB 102. As a result, example embodiments allow for reducing the indication overhead as much as possible.

According to one example embodiment, for a packet which is associated to a bitmap indicating that it is intended for more than one RLC entity, the SgNB 102 may copy and transfer the packet to any indicated RLC entity. It is noted that such functionality of copying and transferring packets at the SgNB 102 is rather light, as it does not require any PDCP protocol knowledge, i.e., there is no need to inspect the sequence number of the PDCP PDU within the PDCP header.

In one example embodiment, the interpretation of the bitmap may be agreed during the node configuration handshake (e.g. during SgNB addition/reconfiguration). In another example embodiment, the MgNB 101 may indicate the corresponding RLC entity to be used as part of the SgNB 102 addition/reconfiguration. This may be associated to a timer, a number of packets, etc. It is noted that the MgNB 101 may (dynamically) select among the different RLC entities available, for example, based on load associated to the related component carriers (CCs) which are to be used to transfer the packet buffered at the related RLC entities, UE's signal quality towards those CCs, etc. In another example embodiment, the SgNB 102 may request the use of a corresponding RLC entity. This request may be associated to a timer, a number of packets, etc.

Figure 2:
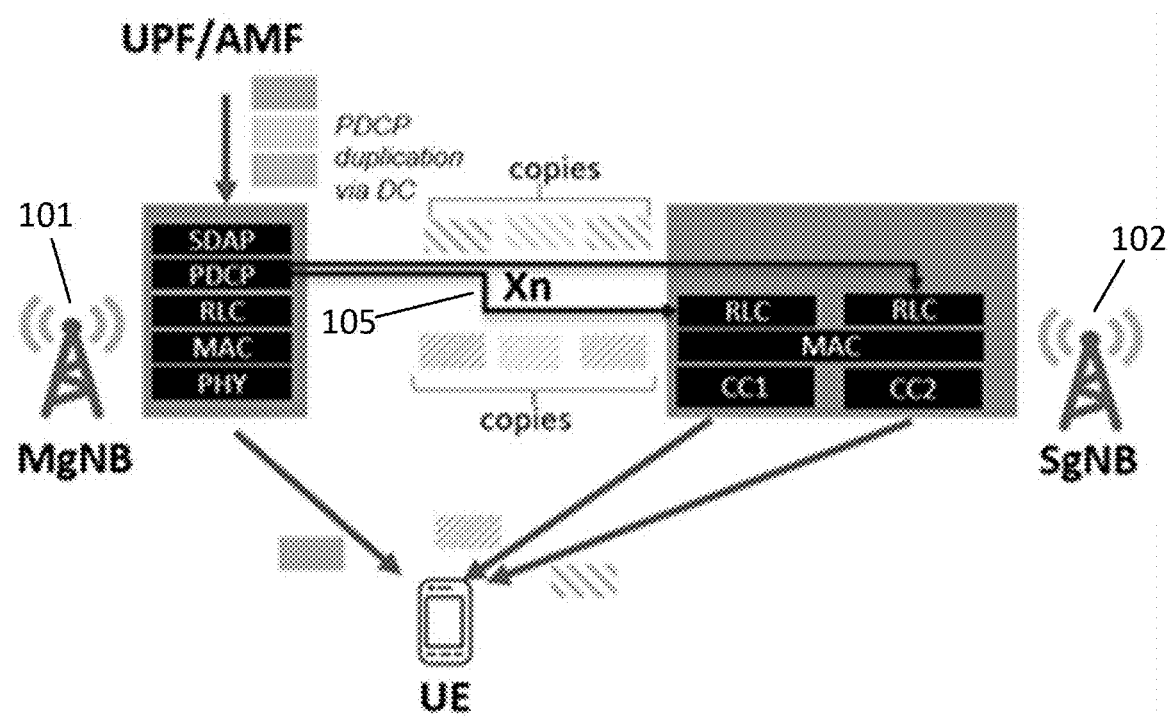
FIG. 2 illustrates an example of PDCP duplication with more than two copies of packets via dual connectivity, according to an example embodiment.
Figure 4A:
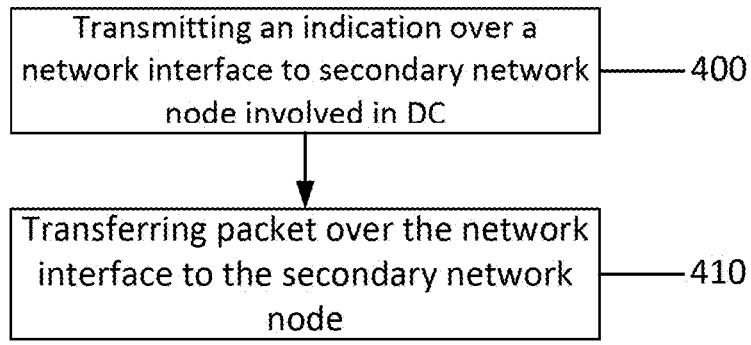
FIG. 4a illustrates an example flow diagram of a method, according to one example embodiment.

FIG. 4a illustrates an example flow diagram of a method for flexible and efficient network interface signaling in MC or DC scenarios with multiple packet duplicates, according to one example embodiment. In certain example embodiments, the flow diagram of FIG. 4a may be performed by a network entity or network node in a 3GPP system, such as LTE or 5G NR. For instance, in some example embodiments, the method of FIG. 4a may be performed by a first network node or base station, which may be a master node, MeNB or MgNB as depicted in the example of FIGS. 1-3.

According to one example embodiment, the method of FIG. 4a may include, at 400, transmitting an indication over a network interface (e.g., Xn or X2 interface) to a secondary network node (e.g., SgNB) involved in MC or DC. In an example embodiment, the indication may be a dynamic routing and duplication indication for how to map a packet (e.g., a PDCP PDU) transferred over the network interface (e.g., Xn or X2) to one or more protocol entities (e.g., RLC entities) at the secondary node. Therefore, in one example embodiment, the indication may indicate, to the secondary node, which one of a plurality of protocol entities a packet is intended for. According to an example embodiment, a protocol entity of the master node may be associated with more than one corresponding or associated protocol entity at the secondary node. In an example embodiment, the network interface may be an interface that interconnects the master node and secondary node, such as an Xn or X2 interface.

According to certain example embodiments, the transmitting 400 may include transmitting a bitmap, e.g., if the packet is intended to more than one protocol entity. In an example embodiment, the transmitting 400 may include transmitting a fallback mode indication that suspends the use of the bitmap to reduce signaling overhead, e.g., if the packet is intended for one protocol entity only. In an example embodiment, where the indication is a bitmap, the length of the bitmap may equal the number of associated protocol entities with a value of 0 or 1 per protocol entity. For example, when the bit is 0 then the packet is not intended for that protocol entity, and when the bit is 1 then the packet is intended for that protocol entity. In some example embodiments, the bitmap may be valid until the master node (e.g., MgNB) overrides it with a new bitmap, or the bitmap may be valid for next N packets or for some pre-defined time after which the secondary node would fallback to some default mode that could be agreed in setup or hard-coded, and/or any combination thereof. It is noted that, in certain example embodiments, the master node can switch dynamically between the bitmap and fallback indication.

In one example embodiment, the transmitting 400 of a fallback mode indication may include signaling a fallback mode flag that suspends the use of the bitmap and initiates the use of an indexing indication, for example, when the network no longer has the need to use more than one protocol entity at a time at the secondary node. According to an example, the indexing indication may include an index associated with each protocol entity to guide the routing of packet(s) at the secondary node.

In an example embodiment, the method of FIG. 4a may further include, at 410, transferring the packet once over the network interface to the secondary node, such that the secondary node may apply the routing and duplication of the packet according to the bitmap or fallback indication. According to an example embodiment, the packet may be a PDCP PDU. In some example embodiments, the indication may be transmitted, to the secondary node, together with the packet. For example, the indication may be transmitted at the same time as the packet or may be appended to the packet, for instance.

According to an example embodiment, the transmitting 400 of the indication may include indicating the corresponding protocol entity to be used as part of the secondary node addition/reconfiguration. This indication of the corresponding protocol entity may be associated to a timer, a number of packets, etc. In another example embodiment, the method may include receiving a request, from the secondary node, for the use of a specific corresponding protocol entity. This request may be associated to a timer, a number of packets, etc.

Figure 4B:
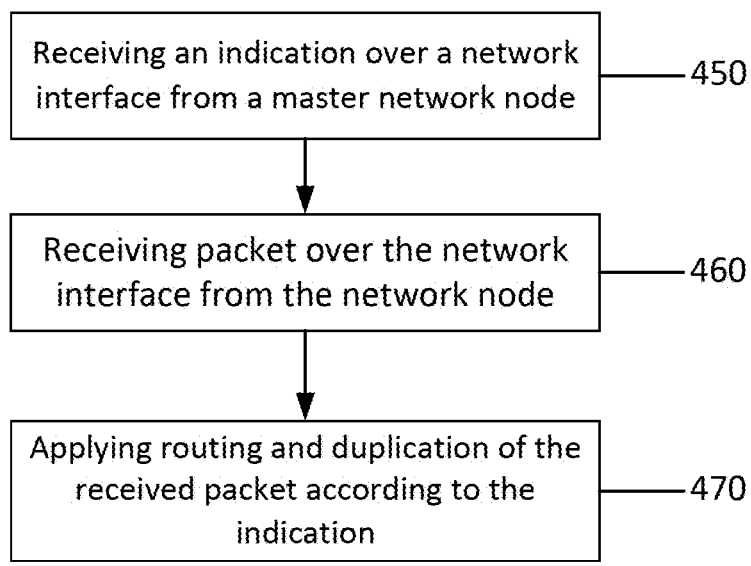
FIG. 4b illustrates an example flow diagram of a method, according to one example embodiment.

FIG. 4b illustrates an example flow diagram of a method for flexible and efficient network interface signaling in MC or DC scenarios with multiple packet duplicates, according to one example embodiment. In certain example embodiments, the flow diagram of FIG. 4b may be performed by a network entity or network node in a 3GPP system, such as LTE or 5G NR. For instance, in some example embodiments, the method of FIG. 4b may be performed by a second network node or base station, which may be a secondary node, SeNB or SgNB as depicted in the example of FIGS. 1-3.

According to one example embodiment, the method of FIG. 4b may include, at 450, receiving an indication over a network interface (e.g., Xn or X2 interface) from a master network node (e.g., MgNB). In an example embodiment, the receiving 450 of the indication may include receiving a dynamic routing and duplication indication for how to map a packet (e.g., a PDCP PDU) transferred over the network interface (e.g., Xn or X2) to one or more protocol entities (e.g., RLC entities) at the secondary node. Therefore, in one example embodiment, the indication may indicate which one of a plurality of protocol entities a packet should be routed to. In an example embodiment, the network interface may be an interface that interconnects the master node and secondary node, such as an Xn or X2 interface.

According to certain example embodiments, the receiving 450 may include receiving the indication as a bitmap, when the packet may be intended to more than one protocol entity at the secondary node. In some example embodiments, the receiving 450 may include receiving a fallback mode indication that suspends the use of the bitmap to reduce signaling overhead, e.g., when the packet is intended for one protocol entity only. In an example embodiment, where the indication is a bitmap, the length of the bitmap may equal the number of associated protocol entities with a value of 0 or 1 indicated for each protocol entity. For example, when a bit is 0 then the packet is not intended for that protocol entity, and when a bit is 1 then the packet is intended for that protocol entity. In some example embodiments, the bitmap may be valid until a new bitmap is received, or the bitmap may be valid for the next N packets or for some pre-defined time after which the secondary node would fallback to some default mode that could be agreed in setup or hard-coded, and/or any combination thereof.

In one example embodiment, the receiving 450 of a fallback mode indication may include receiving a fallback mode flag that suspends the use of the bitmap and initiates the use of an indexing indication, for example, when the network no longer has the need to use more than one protocol entity at a time at the secondary node. According to an example, the indexing indication may include an index associated with each protocol entity to guide the routing of packet(s) at the secondary node.

In an example embodiment, the method of FIG. 4b may further include, at 460, receiving the packet once over the network interface from the master node. The method may then include, at 470, performing or applying routing and duplication of the received packet according to the bitmap or fallback indication. For example, in an example embodiment, the performing 470 may include the duplicating of the packet when the indication from the master node indicates the mapping to more than one associated protocol entity. Further, according to an example embodiment, the performing 470 may include transferring the packet to the one or more protocol entities indicated in the indication received from the master node. According to an example embodiment, the packet may be a PDCP PDU. In some example embodiments, the indication may be received, at the secondary node, together with the packet. For example, the indication may be received at the same time as the packet or may be appended to the packet, for instance.

According to certain example embodiments, the applying 470 may include using a protocol entity association according to a default mode if no indication is received along with the packet transfer. In one example embodiment, for a packet that is associated with bitmap indicating that the packet is intended for multiple protocol entities, the applying 470 may include copying and transferring the packet to any one of the indicated protocol entities.

According to an example embodiment, the receiving 450 of the indication may include receiving the corresponding protocol entity to be used as part of the secondary node addition/reconfiguration. This indication of the corresponding protocol entity may be associated to a timer, a number of packets, etc. In another example embodiment, the method may include requesting, to the master node, for the use of a specific corresponding protocol entity. This request may be associated to a timer, a number of packets, etc.

Thus, in view of the above, example methods allow for the provisioning of an efficient signaling mechanism that supports dynamic network control, at a first network node or base station (e.g., MgNB), of the associated protocol entities (e.g., RLC entities) and packet duplication that should be used at a second network node or base station (e.g., SgNB), where the signaling can fallback to a lean signaling mechanism when only one protocol entity is to be used.

FIG. 5a illustrates an example of an apparatus 10 according to an example embodiment. In an example embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), CU of a gNB, or WLAN access point, associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5*a*.

As illustrated in the example of FIG. 5*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5*a*, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device).

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be a network node, RAN node or base station, such as an eNB or gNB, or the like. In one example embodiment, apparatus 10 may be a MeNB or MgNB, for example. According to certain example embodiments, apparatus 10 may be controlled by memory 14 and processor 12 to perform the functions associated with any of the example embodiments described herein. For example, in some example embodiments, apparatus 10 may be configured to perform one or more of the processes depicted in any of the flow charts or signaling diagrams described herein, such as the signaling diagram illustrated in FIG. 4a or 4b. For instance, in certain example embodiments, apparatus 10 may be configured to perform a procedure for efficient and flexible network interface signaling in MC or DC scenarios with multiple packet duplicates.

In one example embodiment, apparatus 10 may be controlled by memory 14 and processor 12 to transmit an indication over a network interface (e.g., Xn or X2 interface) to a secondary network node (e.g., SgNB). In an example embodiment, the indication may be a dynamic routing and duplication indication for how to map a packet (e.g., a PDCP PDU) transferred over the network interface (e.g., Xn or X2) to one or more protocol entities (e.g., RLC entities) at the secondary node. Therefore, in one example embodiment, the indication may indicate, to the secondary node, which one of a plurality of protocol entities a packet is intended for. According to an example embodiment, a protocol entity of the apparatus 10 may be associated with more than one corresponding protocol entity at the secondary node. In an example embodiment, the network interface may be an interface that interconnects the apparatus 10 and secondary node, such as an Xn or X2 interface.

According to certain example embodiments, apparatus 10 may be controlled by memory 14 and processor 12 to transmit a bitmap, e.g., if the packet is intended to more than one protocol entity. In another example embodiment, apparatus 10 may be controlled by memory 14 and processor 12 to transmit a fallback mode indication that suspends the use of the bitmap to reduce signaling overhead, e.g., if the packet is intended for one protocol entity only. In an example embodiment, where the indication is a bitmap, the length of the bitmap may equal the number of associated protocol entities with a value of 0 or 1 per protocol entity. For example, when the bit is 0 then the packet is not intended for that protocol entity, and when the bit is 1 then the packet is intended for that protocol entity. In some example embodiments, the bitmap may be valid until the apparatus 10 overrides it with a new bitmap, or the bitmap may be valid for next N packets or for some pre-defined time after which the secondary node would fallback to some default mode that could be agreed in setup or hard-coded, and/or any combination thereof. It is noted that, in certain example embodiments, apparatus 10 may be controlled by memory 14 and processor 12 to switch dynamically between the bitmap and fallback indication.

In one example embodiment, apparatus 10 may be controlled by memory 14 and processor 12 to transmit a fallback mode indication that may include a fallback mode flag that suspends the use of the bitmap and initiates the use of an indexing indication, for example, when the network no longer has the need to use more than one protocol entity at a time at the secondary node. According to an example, the indexing indication may include an index associated with each protocol entity to guide the routing of packet(s) at the secondary node.

In an example embodiment, apparatus 10 may be controlled by memory 14 and processor 12 to transfer the packet once over the network interface to the secondary node, such that the secondary node may apply the routing and duplication of the packet according to the bitmap or fallback indication. According to an example embodiment, the packet may be a PDCP PDU. In some example embodiments, apparatus 10 may be controlled by memory 14 and processor 12 to transmit the indication, to the secondary node, together with the packet. For example, the indication may be transmitted at the same time as the packet or may be appended to the packet, for instance.

According to an example embodiment, apparatus 10 may be controlled by memory 14 and processor 12 to transmit an indication of the corresponding protocol entity to be used as part of the secondary node addition/reconfiguration. This indication of the corresponding protocol entity may be associated to a timer, a number of packets, etc. In another example embodiment, apparatus 10 may be controlled by memory 14 and processor 12 to receive a request, from the secondary node, for the use of a specific corresponding protocol entity. This request may be associated to a timer, a number of packets, etc.

FIG. 5b illustrates an example of an apparatus 20 according to another example embodiment. In example embodiments, apparatus 20 may be a node or server associated with a radio access network, such as a LTE network, 5G or NR or other radio systems which might benefit from an equivalent procedure. For example, in certain example embodiments, apparatus 20 may include a base station, a Node B, an evolved Node B (eNB), 5G Node B or access point, next generation Node B (NG-NB or gNB), CU of a gNB, or WLAN access point, associated with a radio access network, such as a GSM network, LTE network, 5G or NR.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, in one example embodiment, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain examples, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR. For instance, in an example embodiment, link 70 may represent an Xn or X2 interface.

According to some example embodiments, processor 22 and memory 24 may be included in or may form a part of processing circuitry or control circuitry. In addition, in some example embodiments, transceiver 28 may be included in or may form a part of transceiving circuitry.

As discussed above, according to example embodiments, apparatus 20 may be a network node or functions, such as an authentication server or function. According to certain examples, apparatus 20 may be controlled by memory 24 and processor 22 to perform the functions associated with example embodiments described herein. For instance, in some example embodiments, apparatus 20 may be configured to perform one or more of the processes depicted in any of the diagrams or signaling flow diagrams described herein, such as those illustrated in FIG. 4a or 4b. As an example, apparatus 20 may be a secondary network node, SeNB or SgNB, for instance. In example embodiments, apparatus 20 may be configured to perform a procedure for efficient and flexible network interface signaling in MC or DC scenarios with multiple packet duplicates.

According to certain example embodiments, apparatus 20 may be controlled by memory 24 and processor 22 to receive an indication over a network interface (e.g., Xn or X2 interface) from a master network node (e.g., MgNB). In an example embodiment, the indication may include a dynamic routing and duplication indication for how to map a packet (e.g., a PDCP PDU) transferred over the network interface (e.g., Xn or X2) to one or more protocol entities (e.g., RLC entities) at the apparatus 20. Therefore, in one example embodiment, the indication may indicate which one of a plurality of protocol entities a packet should be routed to. In an example embodiment, the network interface may be an interface that interconnects the master node and apparatus 20, such as an Xn or X2 interface.

According to certain example embodiments, apparatus 20 may be controlled by memory 24 and processor 22 to receive the indication as a bitmap, when the packet may be intended to more than one protocol entity at the secondary node. In some other example embodiments, apparatus 20 may be controlled by memory 24 and processor 22 to receive a fallback mode indication that suspends the use of the bitmap to reduce signaling overhead, e.g., when the packet is intended for one protocol entity only. In an example embodiment, where the indication is a bitmap, the length of the bitmap may equal the number of associated protocol entities with a value of 0 or 1 indicated for each protocol entity. For example, when a bit is 0 then the packet is not intended for that protocol entity, and when a bit is 1 then the packet is intended for that protocol entity. In some example embodiments, the bitmap may be valid until a new bitmap is received, or the bitmap may be valid for the next N packets or for some pre-defined time after which the secondary node would fallback to some default mode that could be agreed in setup or hard-coded, and/or any combination thereof.

In one example embodiment, the fallback mode indication may include a fallback mode flag that suspends the use of the bitmap and initiates the use of an indexing indication, for example, when the network no longer has the need to use more than one protocol entity at a time at the secondary node. According to an example, the indexing indication may include an index associated with each protocol entity to guide the routing of packet(s) at the apparatus 20.

In an example embodiment, apparatus 20 may be controlled by memory 24 and processor 22 to receive the packet once over the network interface from the master node. According to one example embodiment, apparatus 20 may then be controlled by memory 24 and processor 22 to perform routing and duplication of the received packet according to the bitmap or fallback indication. According to an example embodiment, the packet may be a PDCP PDU. In some example embodiments, apparatus 20 may be controlled by memory 24 and processor 22 to receive the indication together with the packet. For example, the indication may be received at the same time as the packet or may be appended to the packet, for instance.

According to certain example embodiments, apparatus 20 may be controlled by memory 24 and processor 22 to use a protocol entity association according to a default mode if no indication is received, from the master node, along with the packet transfer. In one example embodiment, for a packet that is associated with bitmap indicating that the packet is intended for multiple protocol entities, apparatus 20 may be controlled by memory 24 and processor 22 to copy and transfer the packet to any one of the indicated protocol entities.

According to an example embodiment, apparatus 20 may be controlled by memory 24 and processor 22 to receive the corresponding protocol entity to be used as part of the addition/reconfiguration of apparatus 20. This indication of the corresponding protocol entity may be associated to a timer, a number of packets, etc. In another example embodiment, apparatus 20 may be controlled by memory 24 and processor 22 to request, from the master node, the use of a specific corresponding protocol entity. This request may be associated to a timer, a number of packets, etc.

FIG. 5c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 5c.

As illustrated in the example of FIG. 5c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 5c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a UE, mobile device, mobile station, ME, IoT device and/or NB-IoT device, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein. As an example, apparatus 30 may correspond to one or more of the UE(s) illustrated in FIGS. 1-3. According to certain example embodiments, apparatus 30 may be controlled by memory 34 and processor 32 to receive downlink communications from network node(s) (e.g., apparatus 10 or apparatus 20) and/or to transmit uplink communications to the network node(s) (e.g., apparatus 10 or apparatus 20).

In view of the above, example embodiments of the invention provide several technical effects and/or improvements and/or advantages. Example embodiments provide an efficient and flexible network interface signaling mechanism that enables a first network node, such as a MgNB, to provision a dynamic routing and duplication indication to a second network node, such as a SgNB, for how to map a packet transferred over a network interface (e.g., Xn or X2) to one or more protocol entities at the second network node. Example embodiments are able to avoid wasting the network interface capacity and requires minimal processing at the second node to copy and transfer a packet received over the network interface to the indicated protocol entities, without requiring any PDCP knowledge. As such, certain example embodiments can improve performance and throughput of network nodes including, for example, base stations, eNBs, gNBs and/or UEs. Accordingly, the use of example embodiments of the invention result in improved functioning of communications networks and their nodes.

In some example embodiments, the functionality of any of the methods, processes, signaling diagrams, or flow charts described herein may be implemented by software and/or computer program code or portions of code stored in memory or other computer readable or tangible media, and executed by a processor.

In certain example embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out example embodiments described herein. The one or more computer-executable components may include at least one software code or portions of code. Modifications and configurations required for implementing the functionality of an example embodiment may be performed as routine(s), which may be implemented as added or updated software routine(s). In some example embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other example embodiments, the functionality may be performed by hardware, for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some example embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

We claim:

1. A method, comprising:
   transmitting, by a first network node, an indication over a network interface to a second network node involved in multi connectivity, wherein the indication indicates how to map a packet transferred over the network interface to one or more protocol entities at the second network node; and transferring the packet once over the network interface to the second network nod;

wherein a protocol entity of the first network node is associated with a plurality of associated protocol entities at the second network node, and wherein the transmitting of the indication comprises transmitting a bitmap for indicating which of the plurality of associated protocol entities the packet is intended for.

2. A method, comprising:

receiving, at a second network node involved in multi connectivity, an indication over a network interface from a first network node, wherein the indication comprises an indication for how to map a packet transferred over the network interface to one or more protocol entities at the second network node;

receiving the packet once over the network interface from the first network node; and performing routing and duplication of the received packet according to the indication, wherein a protocol entity of the first network node is associated with a plurality of associated protocol entities at the second network node, and wherein the receiving of the indication comprises receiving a bitmap for indicating which of the plurality of associated protocol entities the packet is intended for.

3. An apparatus, comprising:

at least one processor; and at least one memory comprising computer program code, the at least one memory and computer program code configured, with the at least one processor, to cause the apparatus at least to transmit an indication over a network interface to a second network node involved in multi connectivity, wherein the indication indicates how to map a packet transferred over the network interface to one or more protocol entities at the second network node; and transfer the packet once over the network interface to the second network node, wherein a protocol entity of the apparatus is associated with a plurality of associated protocol entities at the second network node, and wherein the indication comprises a bitmap to indicate which of the plurality of associated protocol entities the packet is intended for.

4. The apparatus according to claim 3, wherein the network interface comprises one of an Xn or X2 interface, wherein the first network node comprises a master next generation or evolved node B and the second network node comprises a secondary next generation or evolved node B, and wherein the packet comprises a packet data convergence protocol (PDCP) protocol data unit (PDU) and the protocol entities comprise radio link control (RLC) entities.

5. The apparatus according to claim 3, wherein the bitmap is (a) valid until the first network node overrides it with a new bitmap, or (b) valid for next N packets or for some pre-defined time after which the second network node will fallback to a default mode, and/or any combination of (a) or (b).

6. The apparatus according to claim 3, wherein the transmitting of the indication comprises transmitting a fallback mode indication that suspends the use of the bitmap.

7. The apparatus according to claim 6, wherein the fallback mode indication comprises a fallback mode flag that suspends the use of the bitmap and initiates the use of an indexing indication, wherein the indexing indication comprises an index associated with each of the protocol entities to guide the routing of packet(s) at the secondary node.

8. The apparatus according to claim 3, wherein the transmitting of the indication comprises indicating the associated protocol entity to be used as part of the second network node addition or reconfiguration procedures.

9. The apparatus according to claim 3, further comprising receiving a request, from the second network node, for the use of a specific associated protocol entity.

10. An apparatus, comprising:

at least one processor; and at least one memory comprising computer program code, the at least one memory and computer program code configured, with the at least one processor, to cause the apparatus at least to receive, at a second network node involved in multi connectivity, an indication over a network interface from a first network node, wherein the indication comprises an indication for how to map a packet transferred over the network interface to one or more protocol entities at the second network node;

receive the packet once over the network interface from the first network node; and perform routing and duplication of the received packet according to the indication, wherein a protocol entity of the first network node is associated with a plurality of associated protocol entities at the second network node, and wherein the indication comprises a bitmap to indicate which of the plurality of associated protocol entities the packet is intended for.

11. The apparatus according to claim 10, wherein the network interface comprises one of an Xn or X2 interface, wherein the first network node comprises a master next generation or evolved node B and the second network node comprises a secondary next generation or evolved node B, and wherein the packet comprises a packet data convergence protocol (PDCP) protocol data unit (PDU) and the protocol entities comprise radio link control (RLC) entities.

12. The apparatus according to claim 10, wherein the bitmap is (a) valid until the first network node overrides it with a new bitmap, or (b) valid for next N packets or for some pre-defined time after which the second network node will fallback to a default mode, and/or any combination of (a) or (b).

13. The apparatus according to claim 10, wherein the receiving of the indication comprises receiving a fallback mode indication that suspends the use of the bitmap.

14. The apparatus according to claim 13, wherein the fallback mode indication comprises a fallback mode flag that suspends the use of the bitmap and initiates the use of an indexing indication, wherein the indexing indication comprises an index associated with each of the protocol entities to guide the routing of packet(s) at the secondary node.

15. The apparatus according to claim 10, wherein the receiving of the indication comprises receiving an indication of the associated protocol entity to be used as part of the second network node addition or reconfiguration procedures.

16. The method apparatus according to claim 10, further comprising transmitting a request, to the first network node, for the use of a specific associated protocol entity.

* * * * *